United States Patent
Liu et al.

(10) Patent No.: US 11,909,095 B2
(45) Date of Patent: Feb. 20, 2024

(54) TRANSMISSION MECHANISM FOR BASE STATION ANTENNA AND BASE STATION ANTENNA

(71) Applicant: CommScope Technologies LLC, Hickory, NC (US)

(72) Inventors: Nengbin Liu, Suzhou (CN); Zhigang Wang, Suzhou (CN); Fan He, Suzhou (CN); Ruixin Su, Suzhou (CN); PuLiang Tang, Suzhou (CN)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 24 days.

(21) Appl. No.: 17/692,434

(22) Filed: Mar. 11, 2022

(65) Prior Publication Data

US 2022/0336940 A1 Oct. 20, 2022

(30) Foreign Application Priority Data

Apr. 14, 2021 (CN) .......................... 202110397751.1

(51) Int. Cl.
*H01Q 1/12* (2006.01)
*H01Q 1/24* (2006.01)

(52) U.S. Cl.
CPC .............. *H01Q 1/125* (2013.01); *H01Q 1/12* (2013.01); *H01Q 1/24* (2013.01); *H01Q 1/246* (2013.01)

(58) Field of Classification Search
CPC .......... H01Q 1/125; H01Q 1/246; H01Q 1/12; H01Q 1/24

(Continued)

(56) References Cited

U.S. PATENT DOCUMENTS 4,489,248 A * 12/1984 Petersen ................... H02K 7/06
310/83
6,603,436 B2 * 8/2003 Heinz ....................... H01Q 3/32
342/368

(Continued)

FOREIGN PATENT DOCUMENTS

CN 206564334 U 10/2017
CN 112467386 A 3/2021

(Continued)

OTHER PUBLICATIONS

"Extended European Search Report corresponding to European Application No. 22167009.4 dated Aug. 30, 2022".

*Primary Examiner* — Hai V Tran
(74) *Attorney, Agent, or Firm* — Myers Bigel, P.A.

(57) ABSTRACT

The present disclosure relates to a transmission mechanism for a base station antenna, and a base station antenna including the transmission mechanism. The transmission mechanism includes a motor and at least one connecting rod, wherein a gear mechanism is provided on a first end of the connecting rod, and the motor drives the connecting rod to rotate via the gear mechanism; and wherein a worm gear unit is provided on a second end of the connecting rod opposite to the first end, and the worm gear unit is configured to drive a movable element of a phase shifter when the connecting rod rotates. The transmission mechanism according to the present disclosure can generate greater driving force through the worm gear unit, and has a shorter axial length and a smaller height, and thus is particularly suitable for a more compact and thinner 5G base station antenna.

19 Claims, 7 Drawing Sheets

(58) Field of Classification Search
USPC .................................................... 343/700 R
See application file for complete search history.

(56) References Cited

U.S. PATENT DOCUMENTS

| | | | | |
|---|---|---|---|---|
| 8,674,787 B2* | 3/2014 | Bradley | .................. | H01P 1/184 |
| | | | | 333/260 |
| 11,450,956 B2* | 9/2022 | Jang | ..................... | H01Q 1/1285 |
| 2013/0307728 A1* | 11/2013 | Berger | ................... | H01Q 1/246 |
| | | | | 342/374 |
| 2017/0373379 A1* | 12/2017 | Schmutzler | .......... | F16M 11/048 |
| 2020/0358170 A1* | 11/2020 | N. | ............................ | H01Q 3/36 |

FOREIGN PATENT DOCUMENTS

| WO | 2019091239 A1 | 5/2019 |
|---|---|---|
| WO | 2019212721 A1 | 11/2019 |

\* cited by examiner

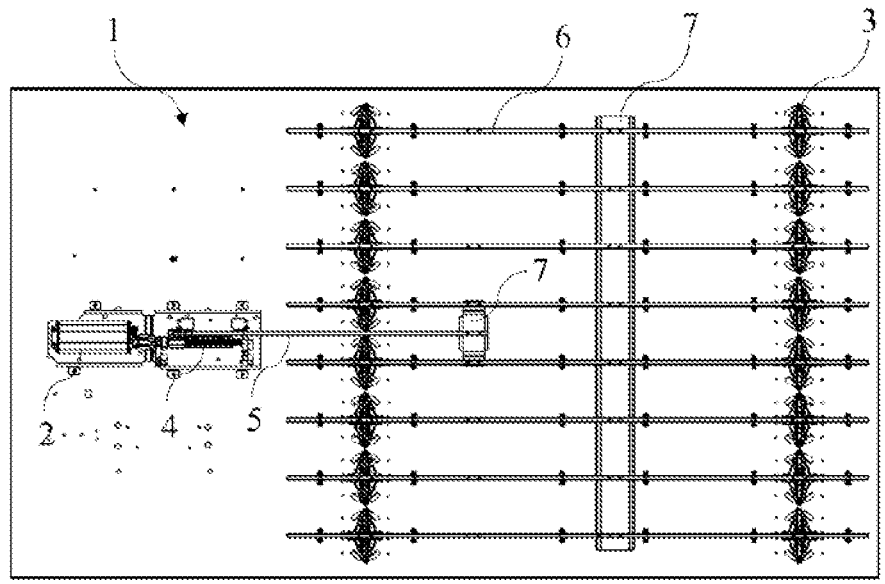
Fig. 1
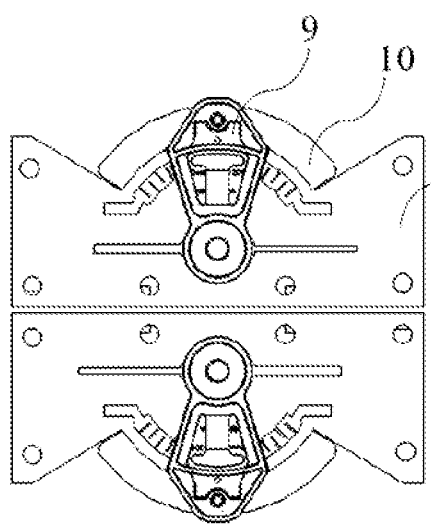 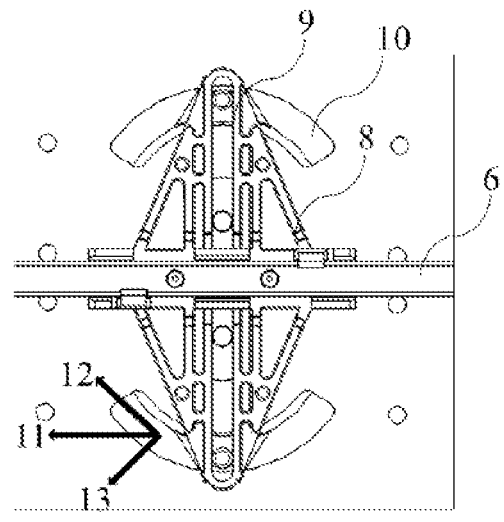
Fig. 2a  Fig. 2b

TRANSMISSION MECHANISM FOR BASE STATION ANTENNA AND BASE STATION ANTENNA

RELATED APPLICATION

The present application claims priority from and the benefit of Chinese Patent Application No. 202110397751.1, filed Apr. 14, 2021, the disclosure of which is hereby incorporated herein by reference in full.

FIELD OF THE INVENTION

The present invention generally relates to a communication system. More particularly, the present invention relates to a transmission mechanism for a base station antenna, and a base station antenna including such transmission mechanism.

BACKGROUND OF THE INVENTION

A cellular communication system is used to provide, wireless communication to fixed and mobile users. The cellular communication system may include a plurality of base stations, and each base station provides a wireless cellular service for a designated coverage area (generally referred to as a "cell"). Each base station may include one or more base station antennas, and the base station antenna is used to transmit radio frequency ("RF") signals to a user located in a cell served by the base station and receive RF signals from the user. The base station antenna is a directional device that can concentrate RF energy transmitted in certain directions or received from certain directions.

A modern base station antenna usually includes two, three or more linear (or planar) arrays of radiating elements, where each linear array has an electronically adjustable downtilt angle. The linear array usually includes a cross-polarized radiating element, and is provided with a separate phase shifter for electronically adjusting the downtilt angle of antenna beams for each polarization, so that the antenna can include twice the phase shifters of the linear array. In addition, in many antennas, a separate transmitting and receiving phase shifter is provided so that transmitting and receiving radiation patterns can be adjusted independently. This would again double the number of phase shifters. Therefore, it is not surprising that the base station antenna has eight, twelve, eighteen, thirty-two, or more phase shifters for applying remote electrical downtilt angles to linear arrays.

A remote electrical tilt ("RET") actuator and an associated transmission mechanism may be provided in the base station antenna to adjust the phase shifter. Conventionally, each phase shifter is equipped with a separate RET actuator, which results in the base station antenna including a large number of RET actuators, thereby significantly increasing the size, weight, and cost of the base station antenna. Therefore, in some cases, it is necessary to use a RET actuator including a single motor to simultaneously drive a plurality of phase shifters.

FIG. 1 shows a transmission mechanism 1 of the prior art, which attempts to use a single motor 2 to drive a plurality of shifters 3. The transmission mechanism 1 includes a driving rod 5 driven by the motor 2 via a screw 4 and a plurality of connecting rods 6 parallel to the driving rod 5 and spaced apart from each other in a transverse direction perpendicular to an axial direction of the driving rod 5. Each connecting rod 6 can drive one or more phase shifters to adjust downtilt angles thereof. A plurality of connecting rods 6 are fixed together via one or more connecting plates 7 to simultaneously move axially when driven by the driving rod 5, thereby driving a plurality of phase shifters.

Limited by the output power of the motor 2, the transmission mechanism 1 of the prior art can only drive a limited number of phase shifters. For example, currently a motor usually used in a base station antenna can generate a pulling force of about 10 lbf, while a pulling force of about 0.7 lbf is needed to drive a phase shifter. Therefore, a motor can only drive up to 14 phase shifters. However, in some cases, it is required that a single motor be used to drive at least 32 phase shifters, and the transmission mechanism 1 obviously cannot meet such requirement.

Moreover, since the plurality of connecting rods 6 are spaced apart from each other in the transverse direction, each connecting rod 6 has a moment arm as compared with the driving rod 5, and has torque as a result. Since each connecting rod 6 has a different moment arm size compared with the driving rod 5, the generated torque is also different, which will cause the plurality of connecting rods 6 to generate uneven driving forces and therefore affect the adjustment accuracy of the corresponding phase shifters.

Furthermore, as shown in FIG. 2a and FIG. 2b, in the prior art, each connecting rod 6 drives a movable element 9 of each phase shifter via a connecting element 8 fixed thereon to make the movable element 9 move in an arc-shaped groove 10. When the movable element 9 deviates from the central position of the arc-shaped groove 10, a pulling force 11 generated by the connecting rod 6 will generate a tangential component 12 and a radial component 13, of which only the tangential component 12 can be used to drive the movable element 9. This reduces the effective pulling force generated by the connecting rod 6, thereby further reducing the number of phase shifters that can be driven by a single motor 2. In addition, when the movable element 9 moves to both ends of the arc-shaped groove 10, the movable element 9 may be stuck at the end portions of the arc-shaped groove 10 and be difficult to move out. Therefore, a larger force is required, which further reduces the number of phase shifters that can be driven by a single motor 2.

SUMMARY OF THE INVENTION

An object of the present invention is to provide a transmission mechanism for a base station antenna and a base station antenna including the transmission mechanism, which can overcome at least one defect in the prior art.

In a first aspect of the present invention, a transmission mechanism for a base station antenna is provided. The transmission mechanism may include: a worm gear unit, which includes a worm driven by a motor and a worm gear meshed and connected with the worm; at least one gear pair, each gear pair including a small gear and a large gear that mesh with each other, the small gear and the worm gear being mounted on a common first drive shaft so that the small gear and the worm gear rotate synchronously; and at least one connecting rod, each connecting rod including a first rack element fixedly mounted thereon, wherein the large gear of each gear pair is meshed and connected with the first rack element on a corresponding connecting rod so as to axially move the connecting rod via the first rack element when the large gear of each gear pair rotates.

According to an embodiment of the present invention, the transmission mechanism may further include an arc-shaped connecting member adapted to be fixedly connected to a movable element of a phase shifter, and the arc-shaped connecting member is configured to be rotationally driven to cause the movable element of the phase shifter to move along an arc.

According to an embodiment of the present invention, the arc-shaped connecting member may be configured as an arc-shaped rack, a plurality of teeth are provided on a front end surface of the arc-shaped rack, each connecting rod may include at least one second rack element mounted thereon, and the second rack element is meshed and connected with the plurality of teeth of the arc-shaped rack so as to rotate the arc-shaped rack when the connecting rod moves axially.

According to an embodiment of the present invention, each second rack element may include two sets of teeth arranged in a mirror image, and each set of teeth is meshed and connected with an arc-shaped rack so that each second rack element can simultaneously drive two movable elements of a pair of phase shifters.

According to an embodiment of the present invention, the at least one gear pair may include a plurality of gear pairs, and small gears of the plurality of gear pairs are mounted on the first drive shaft being spaced apart from each other.

According to an embodiment of the present invention, large gears of the plurality of gear pairs may be mounted on a second drive shaft being spaced apart from each other.

According to an embodiment of the present invention, the worm may extend in a direction of the connecting rod, and the first drive shaft may extend in a direction perpendicular to the connecting rod.

According to an embodiment of the present invention, one end of the worm may be directly or indirectly connected with an output shaft of the motor, and the other end of the worm may be supported by a supporting element.

According to an embodiment of the present invention, the gear ratio of the worm gear and the worm may be from 15 to 50.

According to an embodiment of the present invention, the first drive shaft may have a non-circular cross section, and the small gear may have a non-circular hole used for the first drive shaft.

According to an embodiment of the present invention, the first drive shaft may be integrally formed with the worm gear and/or the small gear.

According to an embodiment of the present invention, the second drive shaft may be integrally formed with the large gear.

According to an embodiment of the present invention, each gear pair may include a supporting member used for the small gear.

According to an embodiment of the present invention, the small gear may include a body including a tooth portion provided with teeth and a shaft portion adapted to be mounted in the supporting member to enable the small gear to rotate. The supporting member may include an annular sleeve, and the shaft portion of the small gear may be rotatably mounted in the annular sleeve.

According to an embodiment of the present invention, the first rack element may include a bottom plate, a vertical plate extending vertically upward from one side of the bottom plate, and a rack located at a top end of the vertical plate, and the vertical plate is provided with a connecting element for connecting with the connecting rod.

According to an embodiment of the present invention, the connecting element may include one or more selected from the group consisting of a post, a snap clip, a bolt, a hook and a connecting fastener, and a groove.

According to an embodiment of the present invention, the second rack element may include a bottom plate, one surface of the bottom plate is provided with a rack and the other opposite surface is provided with a connecting element for connecting with the connecting rod.

According to an embodiment of the present invention, the connecting rod may be made of glass fiber or metal.

According to an embodiment of the present invention, the first drive shaft may be made of glass fiber or metal.

According to an embodiment of the present invention, the second drive shaft may be made of glass fiber or metal.

According to an embodiment of the present invention, the transmission mechanism may be configured to simultaneously drive at least 32 phase shifters by a single motor.

In a second aspect of the present disclosure, a transmission mechanism for a base station antenna is provided. The transmission mechanism may include a motor and at least one connecting rod, wherein a gear mechanism is provided on a first end of the connecting rod, and the motor drives the connecting rod to rotate via the gear mechanism; and wherein a worm gear unit is provided on a second end of the connecting rod opposite to the first end, and the worm gear unit is configured to drive a movable element of a phase shifter when the connecting rod rotates.

According to an embodiment of the present disclosure, the gear mechanism includes a driving gear and a driven gear, the driving gear is configured to be driven by the motor, and the driving gear is meshed and connected with the driven gear to drive the connecting rod to rotate via the driven gear.

According to an embodiment of the present disclosure, each of the driving gear and the driven gear is configured as a helical gear, and a rotation axis of the driving gear and a rotation axis of the driven gear are configured to be perpendicular to each other.

According to an embodiment of the present disclosure, the motor includes an output shaft that extends along an axial direction of the connecting rod, another driving gear is mounted on an end of the output shaft, and the other driving gear is meshed and connected with the driving gear of the gear mechanism to drive the driving gear of the gear mechanism to rotate.

According to an embodiment of the present disclosure, the worm gear unit includes a worm and a toothed arc-shaped connecting member meshed and connected with the worm, wherein, the worm is mounted on the second end of the connecting rod and extends along the axial direction of the connecting rod, and the movable element of the phase shifter is fixedly connected with the arc-shaped connecting member on a side surface of the arc-shaped connecting member.

According to an embodiment of the present disclosure, the worm gear unit includes a pair of arc-shaped connecting members, a first arc-shaped connecting member and a second arc-shaped connecting member of the pair of arc-shaped connecting members are arranged opposite to each other on both sides of the worm and are substantially in the same horizontal plane as the worm.

According to an embodiment of the present disclosure, the inclined direction of teeth of the first arc-shaped connecting member and the inclined direction of teeth of the second arc-shaped connecting member of the pair of arc-shaped connecting members are opposite to each other.

According to an embodiment of the present disclosure, the transmission mechanism further includes a supporting member for supporting the gear mechanism and/or the worm gear unit.

According to an embodiment of the present disclosure, the supporting member includes a base and a ring-shaped body on the base, and the ring-shaped body includes an annular channel for accommodating the gear of the gear mechanism and/or an end of the worm gear unit.

According to an embodiment of the present disclosure, the ring-shaped body is configured as a flexible member and includes a cutout so that the annular channel of the ring-shaped body can expand and/or shrink.

According to an embodiment of the present disclosure, the transmission mechanism includes a plurality of connecting rods which are arranged in parallel, the gear mechanism is provided on a first end of each connecting rod, and the worm gear unit is provided on a second end of each connecting rod.

According to an embodiment of the present disclosure, the plurality of connecting rods is driven by the single motor to rotate synchronously.

According to an embodiment of the present disclosure, the transmission mechanism further includes another gear mechanism, and the motor synchronously drives the gear mechanism provided on the first end of each connecting rod via the other gear mechanism, so that the plurality of connecting rods rotates synchronously.

According to an embodiment of the present disclosure, the other gear mechanism and the gear mechanism provided on the first end of each connecting rod each include a driving gear and a driven gear meshed and connected with each other, the driving gear of the other gear mechanism is fixed at one end of the output shaft of the motor, and the driven gear of the other gear mechanism and the driving gear of the gear mechanism provided on the first end of each connecting rod are fixedly mounted on the same drive shaft.

According to an embodiment of the present disclosure, each of the driving gear and the driven gear is configured as a helical gear, and a rotation axis of the driving gear and a rotation axis of the corresponding driven gear are configured to be perpendicular to each other.

According to an embodiment of the present disclosure, the drive shaft extends in a direction perpendicular to the connecting rod.

According to an embodiment of the present disclosure, the connecting rod is made of glass fiber.

According to an embodiment of the present disclosure, the connecting rod has a non-circular cross-section.

According to an embodiment of the present disclosure, the drive shaft is made of glass fiber.

According to an embodiment of the present disclosure, the drive shaft has a non-circular cross-section.

In a third aspect of the present invention, a base station antenna is provided. The base station antenna may include the transmission mechanism for a base station antenna according to any one embodiment of the present invention.

It should be noted that various aspects of the present invention described for one embodiment may be included in other different embodiments, although specific description is not made for the other different embodiments. In other words, all the embodiments and/or features of any embodiment may be combined in any manner and/or combination, as long as they are not contradictory to each other.

BRIEF DESCRIPTION OF THE DRAWINGS

Multiple aspects of the present invention will be better understood after the following specific embodiments are read with reference to the attached drawings. In the attached drawings:

FIG. 1 shows a transmission mechanism for a base station antenna in the prior art.

FIG. 2a and FIG. 2b respectively show the connection between a transmission mechanism and a phase shifter in the prior art from the front and the back.

It should be understood that in all the attached drawings, the same reference numerals and signs denote the same elements. In the attached drawings, the size of certain features may be changed and are not drawn to scale for clarity.

DESCRIPTION OF THE EMBODIMENTS

Figure 3:
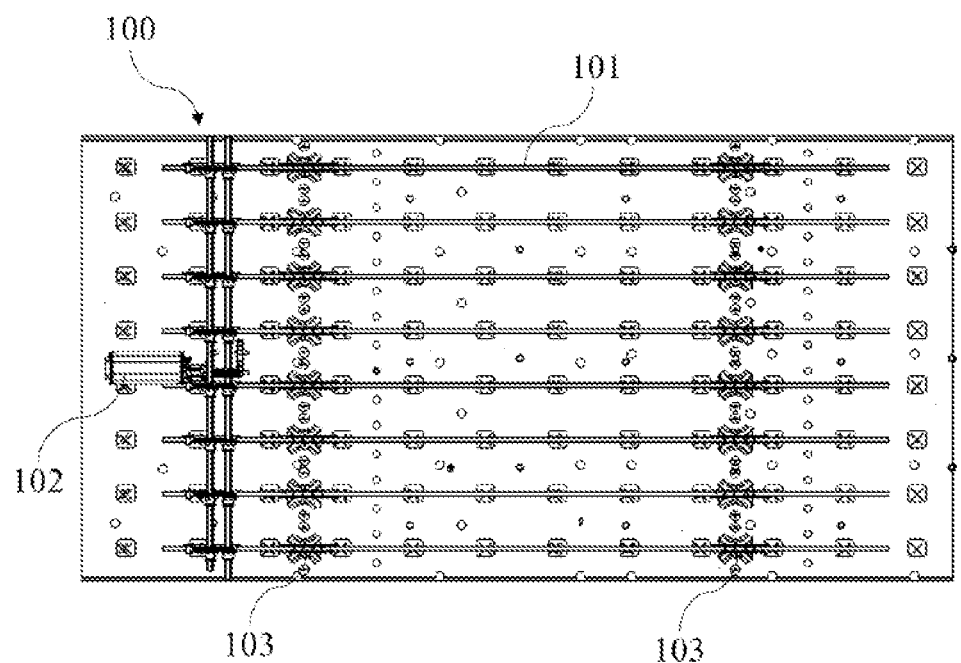
FIG. 3 is a front view showing a transmission mechanism for a base station antenna according to an embodiment of the present invention.

The present invention will be described below with reference to the attached drawings, and the attached drawings illustrate several embodiments of the present invention. However, it should be understood that the present invention may be presented in many different ways and is not limited to the embodiments described below; in fact, the embodiments described below are intended to make the disclosure of the present invention more complete and to fully explain the protection scope of the present invention to those skilled in the art. It should also be understood that the embodiments disclosed in the present invention may be combined in various ways so as to provide more additional embodiments.

It should be understood that the terms in the specification are only used to describe specific embodiments and are not intended to limit the present invention. Unless otherwise defined, all terms (including technical terms and scientific terms) used in the specification have the meanings commonly understood by those skilled in the art. For brevity and/or clarity, well-known functions or structures may not be described in detail.

The singular forms "a", "an", "the" and "this" used in the specification all include plural forms unless clearly indicated. The words "include", "contain" and "have" used in the specification indicate the presence of the claimed features, but do not exclude the presence of one or more other features. The word "and/or" used in the specification includes any or all combinations of one or more of the related listed items.

In the specification, when it is described that an element is "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present.

In the specification, the terms "first", "second", "third", etc. are only used for convenience of description and are not intended to be limiting. Any technical features represented by "first", "second", "third", etc. are interchangeable.

In the specification, terms expressing spatial relations such as "upper", "lower", "front", "rear", "top", and "bottom" may describe the relation between one feature and another feature in the attached drawings. It should be understood that, in addition to the orientations shown in the attached drawings, the terms expressing spatial relations further include different orientations of a device in use or operation. For example, when a device in the attached drawings is turned upside down, the features originally described as being "below" other features now can be described as being "above" the other features. The device may also be oriented in other directions (rotated by 90 degrees or in other orientations), and in this case, a relative spatial relation will be explained accordingly.

Figure 4:
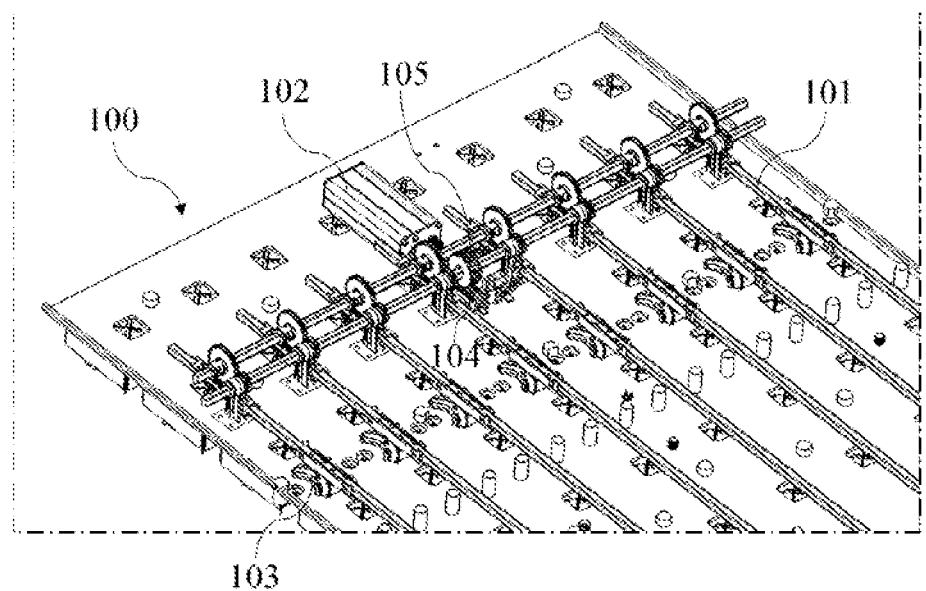
FIG. 4 is a partial perspective view of the transmission mechanism shown in FIG. 3.

Referring to FIG. 3 and FIG. 4, a transmission mechanism 100 for a base station antenna according to an embodiment of the present invention is shown. The transmission mechanism 100 may include a plurality of connecting rods 101 arranged in parallel. The plurality of connecting rods 101 may be driven by a single motor 102 simultaneously to move axially, and each connecting rod 101 may drive a movable element (for example, a brush piece of a rotating brush-type phase shifter) of one or more phase shifters 103 when moving axially to adjust a directional angle (for example, an elevation angle or a downtilt angle) of antenna beams generated by the base station antenna. In the embodiments shown in FIG. 3 and FIG. 4, the transmission mechanism 100 includes eight connecting rods 101 arranged in parallel, and each connecting rod 101 can simultaneously drive two pairs of shifters 103 spaced apart in the axial direction of the connecting rod 101. Therefore, the transmission mechanism 100 can simultaneously drive 32 phase shifters. However, the present invention is not limited thereto, and the transmission mechanism 100 of the present invention may be used to drive any other number of phase shifters. In an embodiment of the present invention, the connecting rod 101 may be made of glass fiber, other plastics, or metal.

Figure 5:
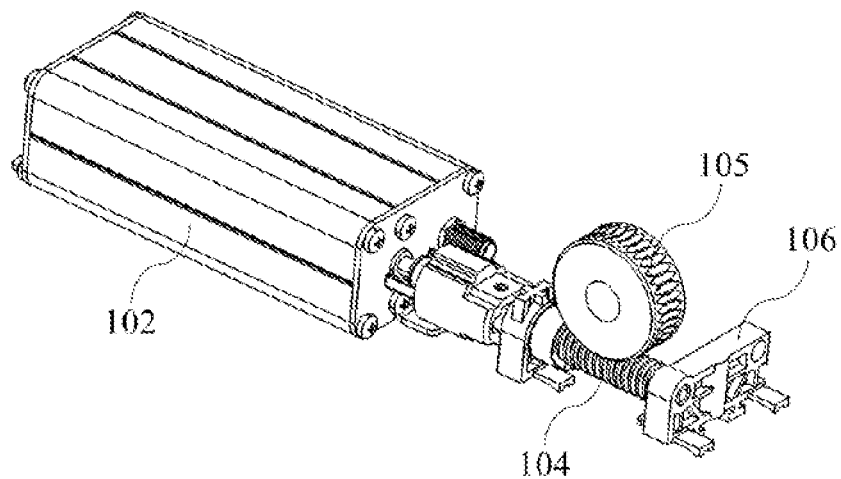
FIG. 5 shows a worm gear unit of the transmission mechanism shown in FIG. 3.

The transmission mechanism 100 may include a worm gear unit. As shown more clearly in FIG. 5, the worm gear unit may include a worm 104 extending in the direction of the connecting rod 101 and a worm gear 105 meshed and connected with the worm 104. The worm 104 is configured to be driven by the motor 102 to rotate about its longitudinal axis. To this end, one end of the worm 104 may be directly or indirectly connected with an output shaft of the motor 102, and the other end of the worm 104 may be supported by a supporting element 106. The worm gear 105 may be arranged above the worm 104 and rotate driven by the worm 104. The central axis of the worm gear 105 may be arranged to be perpendicular to the worm 104.

In an embodiment according to the present invention, the output torque of the motor 102 may be amplified to varying degrees by selecting the gear ratio of the worm gear 105 and the worm 104 of the worm gear unit, so that a single motor 102 can drive a larger number of phase shifters. Generally speaking, the number of heads of the worm 104 may be 1 to 5, and the number of teeth of the worm gear 105 may be several times the number of the heads of the worm 104. In an embodiment according to the present invention, the number of heads of the worm 104 may be 1, and the number of teeth of the worm gear 105 may be 15 to 50. Therefore, the gear ratio of the worm gear 105 and the worm 104 is from 15 to 50. In this way, the worm gear unit can amplify the output torque of the motor 102 by 15 to 50 times, so that when the same motor is used for driving, the pulling force generated by the transmission mechanism 100 is 15 to 50 times the pulling force generated by the transmission mechanism 1 in the prior art. The gear ratio of the worm gear 105 and the worm 104 may also be in other appropriate ranges, such as 5 to 50, 10 to 50, 5 to 40, 5 to 35, 5 to 30, 5 to 20, and so on.

The worm gear unit can reduce the output rotation speed of the motor 102 while amplifying the output torque of the motor 102, and a lower rotation speed makes it possible to adjust the phase shifter more accurately. In addition, comparing with the screw 4 used in the prior art, the worm 104 of the worm gear unit can have a smaller length, which can reduce the space occupied by the transmission mechanism 100 in the base station antenna.

Figure 6:
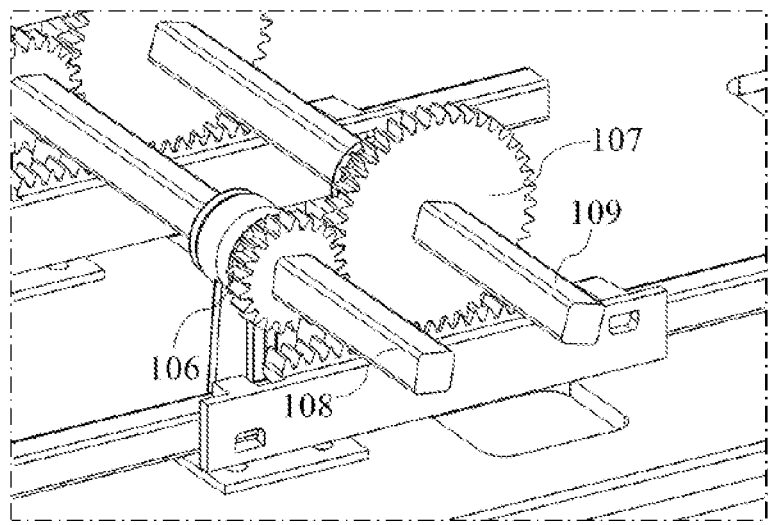
FIG. 6 shows a gear pair of the transmission mechanism shown in FIG. 3 and a rack element fixed on a connecting rod.

The transmission mechanism 100 may further include a plurality of gear pairs, and each gear pair is used to drive a corresponding connecting rod 101. In the embodiments shown in FIG. 3 and FIG. 4, since the transmission mechanism 100 includes eight connecting rods 101, it correspondingly includes eight gear pairs. The gear pair is used to further amplify the output torque of the motor 102. As shown more clearly in FIG. 4 and FIG. 6, each gear pair includes a small gear 106 and a large gear 107 meshed with the small gear 106. All the small gears 106 of the plurality of gear pairs and the worm gear 105 are mounted on a common drive shaft 108 so that the small gears 106 rotate synchronously with the worm gear 105. The drive shaft 108 extends in a direction perpendicular to the connecting rod 101, and the small gears 106 of the plurality of gear pairs are spaced apart from each other on the drive shaft 108. The drive shaft 108 can ensure that the small gears 106 of the plurality of gear pairs have the same rotation speed, and can evenly transmit the output torque of the worm gear 105 to each small gear 106 via the drive shaft 108. This can solve the problem that the driving forces of the plurality of connecting rods 6 are uneven in the transmission mechanism 1 in the prior art, and thus can more accurately adjust a plurality of phase shifters in the base station antenna synchronously.

Similarly, all the large gears 107 of the plurality of gear pairs may also be mounted on a common drive shaft 109 and be spaced apart from each other. The drive shaft 109 makes all the large gears 107 of the plurality of gear pairs have the same rotation speed and therefore have a uniform output torque. However, in other embodiments according to the present invention, the large gears 107 of the plurality of gear pairs may also not be mounted on the common drive shaft 109 but are independent of each other.

According to needs, the output torque of the motor 102 may be further amplified to varying degrees and the output rotation speed of the motor 102 may be reduced at the same by selecting the gear ratio of the large gear 107 and the small gear 106. This makes it possible not only to use a single motor 102 to drive a larger number of phase shifters at the same time, but also to adjust the phase shifters more accurately at a lower speed.

In an embodiment according to the present invention, the drive shaft 108 may have a non-circular (for example, rectangular) cross-section, which extends through a non-circular hole provided in the center of the small gear 106 for matching with the non-circular cross section of the drive shaft 108, so that the small gear 106 is not rotatable relative to the drive shaft 108. Similarly, the drive shaft 109 may have a non-circular (for example, rectangular) cross section, which extends through a non-circular hole provided in the center of the large gear 107 for matching with the non-circular cross section of the drive shaft 109, so that the large gear 107 is not rotatable relative to the drive shaft 109. In another embodiment of the present invention, the drive shaft 108 may be integrally formed with the small gear 106 and the worm gear 105, and the drive shaft 109 may be integrally formed with the large gear 107.

Figures 7A, 7B:
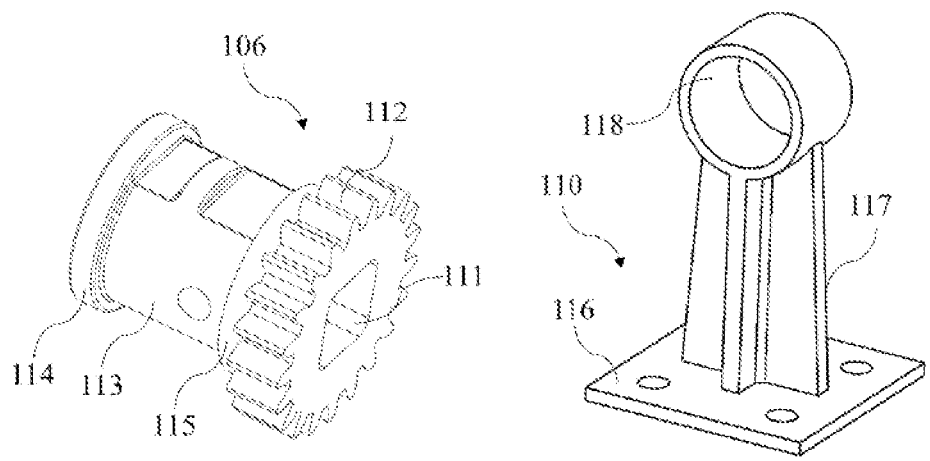
FIG. 7a and FIG. 7b respectively show the specific structure of a small gear of the gear pair shown in FIG. 6 and the specific structure of a supporting member for supporting the small gear.

In order to enhance the support for the small gear 106, a supporting member 110 may be further provided for each small gear of the plurality of gear pairs. FIG. 7a and FIG. 7b respectively show the specific structures of the small gear 106 and the supporting member 110 according to an embodiment of the present invention. The small gear 106 may include a body having a non-circular hole 111. The body includes a tooth portion 112 provided with teeth and a shaft portion 113 adapted to be mounted in the supporting member 110 to enable the small gear to rotate. Both ends of the shaft portion 113 are provided with flanges 114 and 115, and the flanges 114 and 115 restrict the translation of the small gear 106 relative to the supporting member 110. The supporting member 110 may include a base 116, a body 117 extending upright from the base 116, and an annular sleeve 118 at the top end of the body 117. The base 116 may be fixed in the base station antenna. The shaft portion 113 of the small gear 106 may be rotatably mounted in the annular sleeve 118, wherein the flanges 114 and 115 are respectively located on two sides of the annular sleeve 118 to restrict the translation of the small gear 106 relative to the supporting member 110. The supporting member 110 may be configured as a separate structure for ease of the installation of the small gear 106.

Returning to FIG. 6, each gear pair of the transmission mechanism 100 drives a corresponding connecting rod 101 through a rack element 119 meshed and connected with the large gear 107. The rack element 119 may be fixedly mounted on the connecting rod 101. As a result, when the large gear 107 rotates, the large gear 107 can axially move the connecting rod 101 via the rack element 119, thereby moving the movable element of one or more phase shifters 103. Each large gear 107 can drive the corresponding connecting rod 101 more stably and efficiently through the rack element 119.

Figure 8:
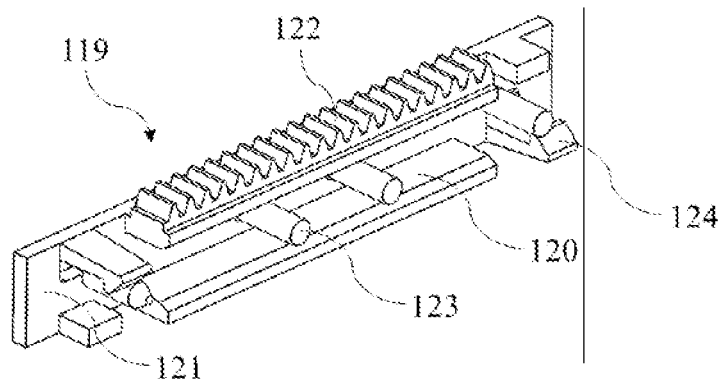
FIG. 8 shows the specific structure of the rack element shown in FIG. 6.

FIG. 8 shows the specific structure of the rack element 119 according to an embodiment of the present invention. The rack element 119 may include a bottom plate 120, a vertical plate 121 extending vertically upward from one side of the bottom plate 120, and a rack 122 located at the top end of the vertical plate 121. The rack 122 includes a plurality of teeth to be meshed with the large gear 107. The vertical plate 121 is provided with a connecting element for connecting with the connecting rod 101. The connecting element may include a series of posts 123 and a pair of snap clips 124. The post 123 is accommodated in a corresponding cylindrical hole in the corresponding connecting rod 101, and the snap clip 124 holds the connecting rod 101 in place when the post is inserted into the cylindrical hole of the connecting rod 101, thereby causing the rack element 119 to be fixed to the connecting rod 101. However, it should be understood that any one of a variety of connecting elements may be used, for example, a post, a bolt, a hook and a connecting fastener, a groove, etc.

Figure 9:
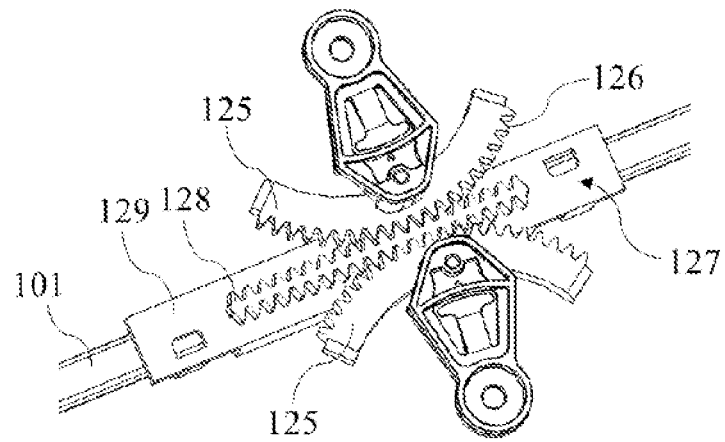
FIG. 9 and FIG. 10 show an arc-shaped connecting member of the transmission mechanism shown in FIG. 3 and a rack element meshed therewith.
Figure 10:
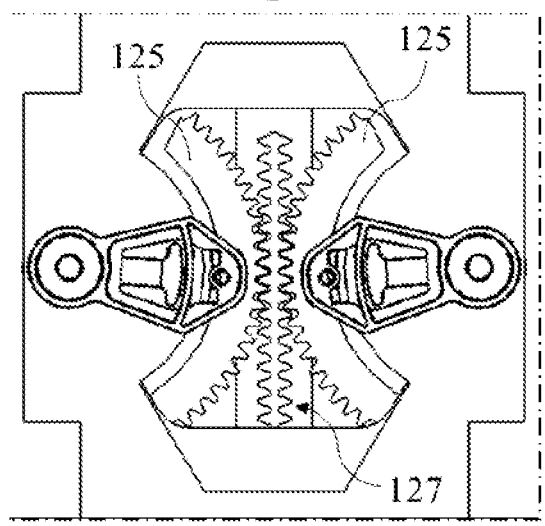

In order to solve the problem that the pulling force 11 generated by the connecting rod 6 of the transmission mechanism 1 in the prior art will generate the tangential component 12 and the radial component 13 when the movable element 9 deviates from the central position of the arc-shaped groove 10, the transmission mechanism 100 of the present invention further includes an arc-shaped connecting member 125 adapted to drive the movable element of the phase shifter to move together along an arc. As shown in FIG. 9 and FIG. 10, the arc-shaped connecting member 125 is configured in the form of an arc-shaped rack, and teeth 126 are provided on the front end surface of the arc-shaped connecting member 125. The movable element (for example, a brush piece of a rotating brush type phase shifter) of the phase shifter may be fixedly connected with the arc-shaped connecting member 125 at the central position of the arc-shaped connecting member 125 so as to move driven by the arc-shaped connecting member 125. The teeth of the arc-shaped connecting member 125 are meshed with teeth 128 of a rack element 127 fixed on the connecting rod 101, so that the arc-shaped connecting member 125 rotates when the rack element 127 moves axially, thereby driving the movable element of the phase shifter to rotate.

Unlike the rack element 119, the rack element 127 includes a bottom plate 129. One surface of the bottom plate 129 is provided with a rack 129 including a plurality of teeth 128, and the opposite surface of the bottom plate 129 is provided with a connecting element such as a post and a snap clip to fix the rack element 127 on the connecting rod 101. In the embodiments shown in FIG. 9 and FIG. 10, each rack element 127 fixed on the connecting rod 101 can drive the movable elements of a pair of phase shifters. Therefore, the rack element 127 may include two sets of teeth 128 arranged in a mirror image, and each set of teeth 128 is meshed with the teeth 126 of an arc-shaped connecting member 125. Accordingly, the two movable elements in each pair of phase shifters are arranged so that their end portions with which the arc-shaped connecting members 125 are connected face each other.

With the help of the arc-shaped connecting member 125, the pulling force of the connecting rod 101 is always maintained in the axial direction of the connecting rod 101 without component in any other directions. As a result, the pulling force of the connecting rod 101 can all be used to move the movable element of the phase shifter without any efficiency loss. In addition, when the arc-shaped connecting member 125 is used, the arc-shaped groove 10 in the prior art is no longer needed. Therefore, there will not be the problem that the removable element of the phase shifter get stuck in the arc-shaped groove 10 and is difficult to move out.

In the embodiments according to the present invention, the worm gear 105, the small gear 106, the large gear 107, the rack elements 119 and 127, and the arc-shaped connecting member 125 may all be made of plastic, and the drive shafts 108 and 109 may be made of glass fiber. In order to further enhance the torsional strength of the drive shafts 108 and 109, the drive shafts 108 and 109 may also be made of metal or other materials with high torsional strength.

Although the transmission mechanism 100 according to the present invention includes a plurality of connecting rods 101 and a plurality of gear pairs in the embodiments shown in FIG. 3 and FIG. 4, the transmission mechanism 100 according to the present invention may also include only one connecting rod 101 and one gear pair. In this case, the transmission mechanism 100 can still amplify the output torque of the motor 102 and reduce the output rotation speed of the motor 102 through the worm gear unit and the gear pair, thereby still retaining all the aforementioned advantages of the transmission mechanism 100.

Figure 11:
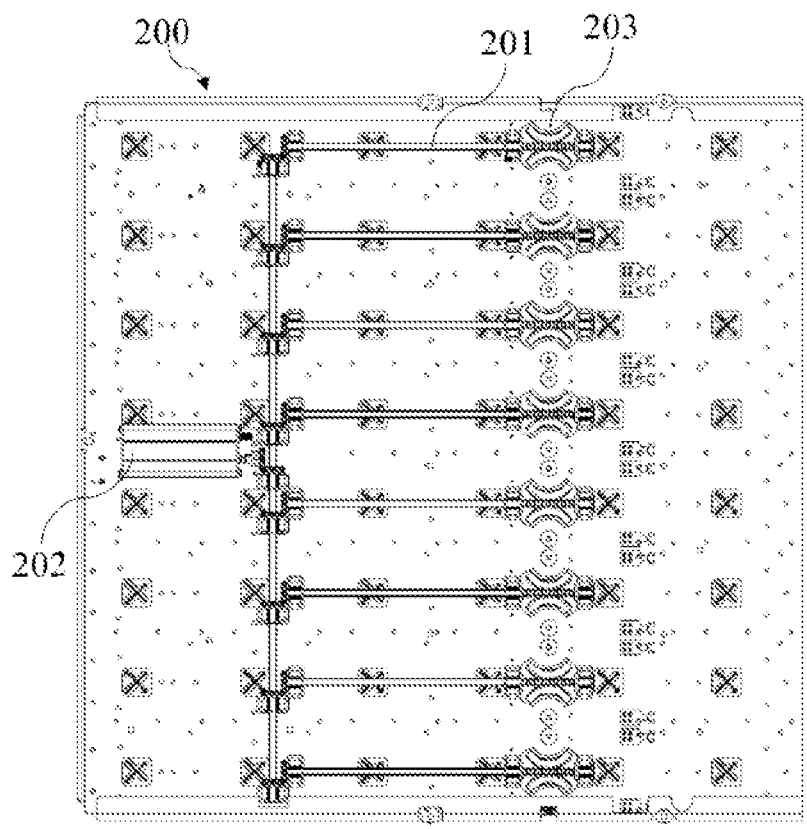
FIG. 11 shows a transmission mechanism for a base station antenna according to another embodiment of the present disclosure.

Referring to FIG. 11, a transmission mechanism 200 for a base station antenna according to another embodiment of the present disclosure is shown. The transmission mechanism 200 may include a plurality of connecting rods 201 arranged in parallel. The plurality of connecting rods 201 may be configured to be driven by a single motor 202 to rotate synchronously, and each connecting rod 201 may drive a movable element (for example, a brush piece of a rotating brush-type phase shifter) of one or more phase shifters 203 when rotating, so as to adjust a directional angle (for example, an elevation angle or a downtilt angle) of antenna beams generated by the base station antenna. Compared with the axially movable connecting rod 101 shown in FIG. 3 and FIG. 4, the connecting rod 201 is configured to be rotatable instead of axially movable, which not only can significantly shorten the axial length of the transmission mechanism 200, thereby reducing the axial space occupied by the transmission mechanism 200, but also can effectively prevent the connecting rod 201 from interfering with other components due to axial movement. In the embodiment shown in FIG. 11, the transmission mechanism 200 includes eight connecting rods 201 arranged in parallel, and each connecting rod 201 can drive a pair of phase shifters 203. However, the present disclosure is not limited thereto, and the transmission mechanism 200 may include more connecting rods 201 and each connecting rod 201 may drive more pairs of phase shifters.

The motor 202 may make the plurality of connecting rods 201 rotate synchronously through a plurality of gear mechanisms. In the embodiments shown in FIGS. 11 to 13, the motor 202 may make the plurality of connecting rods 201 rotate synchronously through a gear mechanism 204 and a plurality of gear mechanisms 205.

Figure 12:
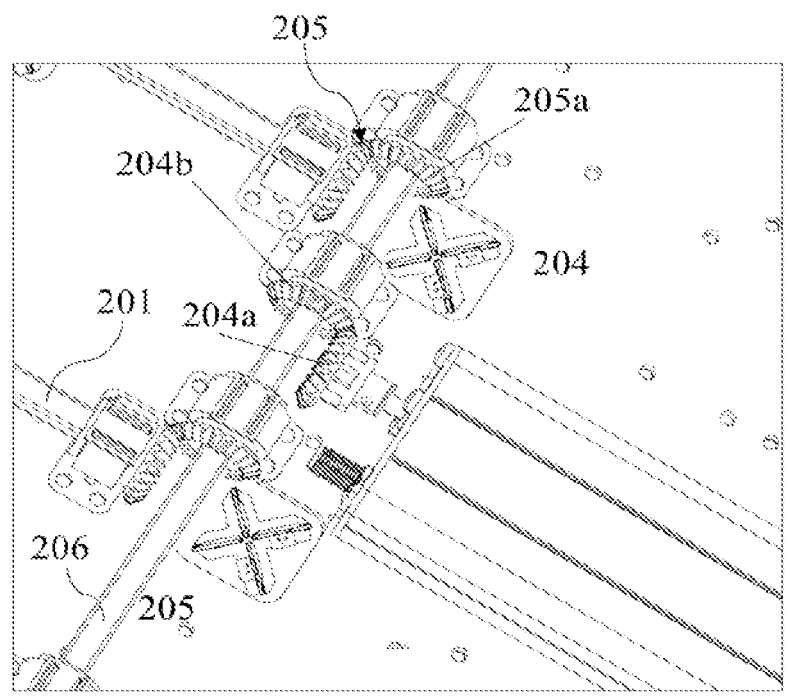
FIG. 12 is a partial perspective view of the transmission mechanism shown in FIG. 11, which shows a gear mechanism mounted between an output shaft and a drive shaft of a motor.

As shown in FIG. 12, the gear mechanism 204 may include a driving gear 204a and a driven gear 204b. The driving gear 204a may be fixedly mounted at one end of an output shaft (which may extend along an axial direction of the connecting rod 201) of the motor 202 and may be driven by the motor 202 to rotate. The driven gear 204b is meshed and connected with the driving gear 204a, so that it can be driven by the driving gear 204a to rotate. In an embodiment according to the present disclosure, the driving gear 204a and the driven gear 204b each may be a helical gear, and the rotation axis of the driving gear 204a and the rotation axis of the driven gear 204b may be configured to be perpendicular to each other. However, the present disclosure is not limited thereto. The driving gear 204a and the driven gear 204b may have any other suitable configurations.

Figure 13:
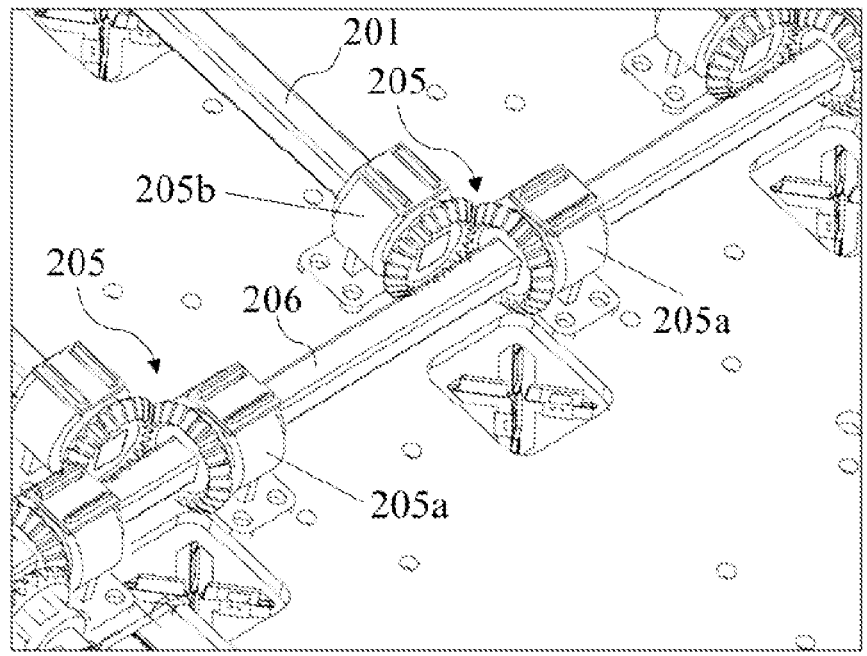
FIG. 13 is another partial perspective view of the transmission mechanism shown in FIG. 11, which shows a gear mechanism mounted between a drive shaft and a connecting rod.

Similarly, as shown in FIG. 13, each gear mechanism 205 may include a driving gear 205a and a driven gear 205b. All the driving gears 205a of the plurality of gear mechanisms 205 and the driven gear 204b of the gear mechanism 204 may be fixedly mounted on a common drive shaft 206 while being spaced apart from each other, so that the driving gears 205a of the plurality of gear mechanisms 205 can rotate synchronously around the rotation axis of the drive shaft 206 driven by the driven gear 204b of the gear mechanism 204. The drive shaft 206 may extend in a direction perpendicular to the connecting rod 201. The driven gear 205b of each gear mechanism 205 may be fixedly mounted on one end of the corresponding connecting rod 201, and may be meshed and connected with the driving gear 205a of the gear mechanism 205, so as to be able to be driven by the driving gear 205a to rotate and thus drive the corresponding connecting rod 201 to rotate. In an embodiment according to the present disclosure, the driving gear 205a and the driven gear 205b each may be a helical gear, and the rotation axis of the driving gear 205a and the rotation axis of the driven gear 205b may be configured to be perpendicular to each other. However, the present disclosure is not limited thereto. The driving gear 205a and the driven gear 205b may have any other suitable configurations.

In another embodiment according to the present disclosure, the transmission mechanism 200 may not include the gear mechanism 204. In the embodiment, one end of the output shaft of the motor 202 may be provided with only a single driving gear, and the single driving gear may be meshed and connected with the driving gear 205a of any one gear mechanism 205 of the plurality of gear mechanisms 205, so as to drive all the driving gears 205a in the plurality of gear mechanisms 205 to rotate synchronously via the drive shaft 206, thereby driving the plurality of connecting rods 201 to rotate synchronously via the driven gears 205b in the plurality of gear mechanisms 205.

Figure 14:
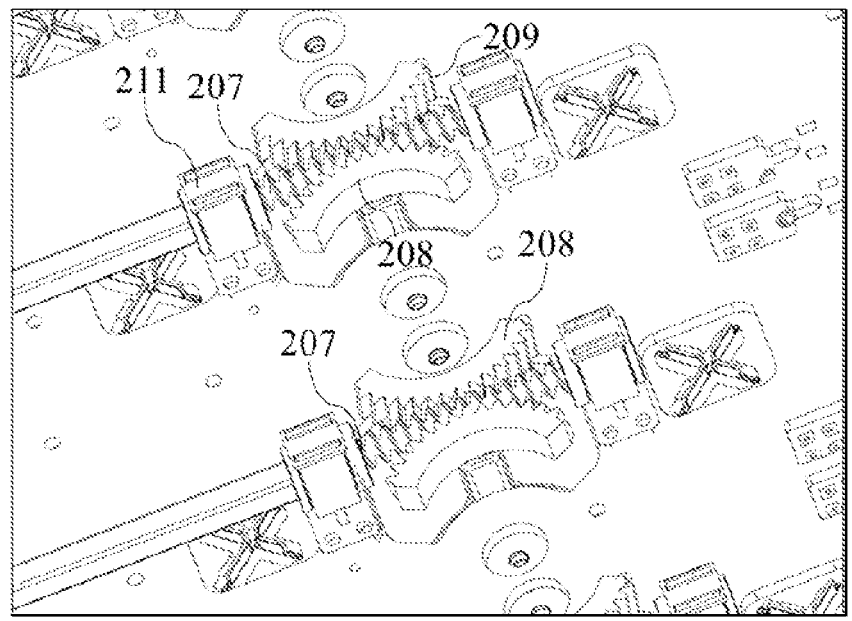
FIG. 14 is further another partial perspective view of the transmission mechanism shown in FIG. 11, which shows a worm gear unit including a worm and an arc-shaped connecting member.

Referring to FIG. 14, in order to enable each connecting rod 201 to drive the movable elements of one or more phase shifters 203 when it rotates, a worm 207 is mounted at an end of the connecting rod 201 opposite to the end at which the driven gear 205b of the gear mechanism 205 is mounted. The worm 207 may extend along the axial direction of the connecting rod 201 and rotate together with the connecting rod 201. Correspondingly, the transmission mechanism 200 further includes an arc-shaped connecting member 208 adapted to drive the movable element of the phase shifter 203 to move together along an arc. As shown in FIG. 14, the arc-shaped connecting member 208 may be configured in the form of an arc-shaped rack or a toothed arc-shaped segment, and teeth 209 are provided on its front end surface so as to be meshed and connected with the worm 207 to form a worm gear unit. A movable element 210 (for example, a brush piece of a rotating brush type phase shifter) of the phase shifter may be fixedly connected with the arc-shaped connecting member 208 at a side surface of the arc-shaped connecting member 208 (see FIG. 15) so as to move along an arc driven by the arc-shaped connecting member 208 when the worm 207 rotates.

Figure 15:
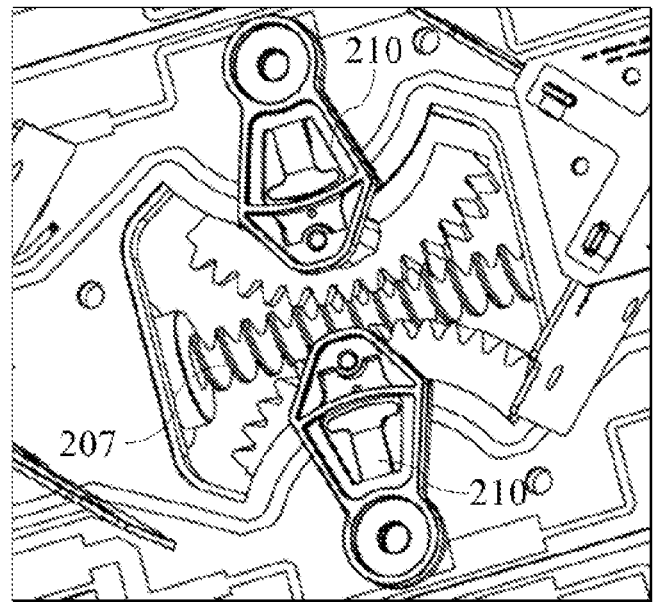
FIG. 15 shows a connection between an arc-shaped connecting member and a movable element of a phase shifter.

As shown in FIG. 14 and FIG. 15, in an embodiment according to the present disclosure, each worm 207 may be meshed with a pair of arc-shaped connecting members 208 to simultaneously drive the movable elements of a pair of phase shifters. The pair of arc-shaped connecting members 208 may be arranged opposite to each other on both sides of the worm 207 and may be substantially in the same horizontal plane as the worm 207. In order to make the pair of arc-shaped connecting members 208 rotate opposite to each other driven by the worm 207, the inclined direction of teeth of a first arc-shaped connecting member and the inclined direction of teeth of a second arc-shaped connecting member in the pair of arc-shaped connecting members 208 may be opposite to each other.

Unlike the transmission mechanism 100 that uses the axial movement of the rack element 127 to drive the movable element of the phase shifter, the transmission mechanism 200 uses the rotation of the worm 207 to drive the movable element of the phase shifter. This method can generate greater driving force, so that a single motor 202 can drive more connecting rods 201 at the same time. In addition, the transmission mechanism 200 does not need to use the rack element 127 and the worm 207 and the arc-shaped connecting member 208 are substantially in the same horizontal plane, so that the height of the entire transmission mechanism 200 can be significantly reduced (the height of the transmission mechanism 100 is about 45 mm, while the height of the transmission mechanism 200 may be only 20 mm). Therefore, the transmission mechanism 200 is particularly suitable for 5G base station antennas. This is because the 5G base station antenna requires the transmission mechanism to occupy a height and a space as smaller as possible so as to make the 5G base station antenna thinner and more compact.

In an embodiment according to the present disclosure, the gear ratio of one or more of the gear mechanism 204, the gear mechanism 205, and the worm gear unit formed by the worm 207 and the arc-shaped connecting member 208 may be 1:1. In other embodiments according to the present disclosure, the output torque of the motor 202 may be amplified to varying degrees by changing the gear ratio of one or more of the gear mechanism 204, the gear mechanism 205, and the worm gear unit formed by the worm 207 and the arc-shaped connecting member 208, so that a single motor 202 can drive a larger number of phase shifters. In addition, amplifying the output torque of the motor 202 can also reduce the output rotation speed of the motor 202, so that the transmission mechanism 200 can adjust the phase shifter more accurately.

Figure 16:
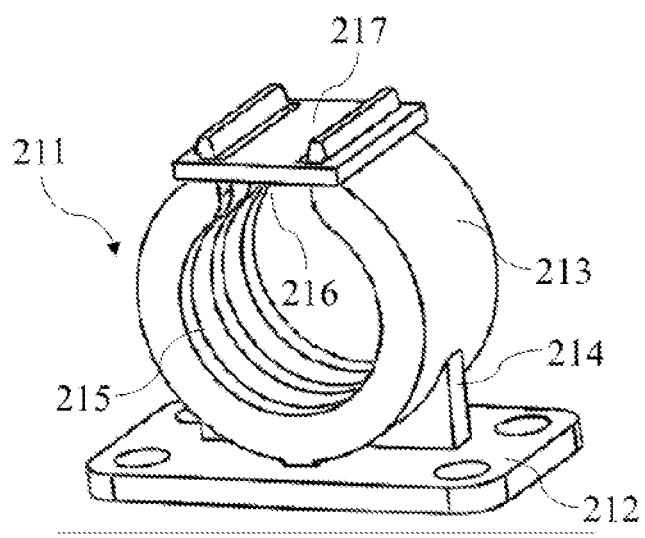
FIG. 16 shows a supporting member for supporting the gear mechanism and/or the worm gear unit of the transmission mechanism shown in FIG. 11 according to an embodiment of the present disclosure.

In an embodiment according to the present disclosure, a supporting member 211 shown in FIG. 16 may be used to support the gear mechanism 204, the gear mechanism 205, and/or the worm 207. The supporting member 211 may include a base 212 and a ring-shaped body 213 on the base 212. The base 212 and the ring-shaped body 213 may be connected by a reinforcing rib 214. The base 212 may be fixed on a corresponding component of the base station antenna. The ring-shaped body 213 includes an annular channel 215, and the gears of the gear mechanisms 204 and 205 (see FIG. 12 and FIG. 13), and/or both ends of the worm 207 (see FIG. 14) may be accommodated in the annular channel 215 and can rotate therein. In an embodiment according to the present disclosure, the ring-shaped body 213 may be configured as a flexible member and may include a cutout 216, so that the annular channel 215 of the ring-shaped body 213 can expand to facilitate the placement of the gears of the gear mechanisms 204 and 205 and/or both ends of the worm 207, and can shrink to constrain the gears of the gear mechanisms 204 and 205 and/or both ends of the worm 207 placed therein. A connecting element 217 may be used to connect the cutout 216. In other embodiments according to the present disclosure, the supporting member 211 may have a structure similar to the supporting member 110.

In an embodiment according to the present disclosure, the connecting rod 201 and the drive shaft 206 may have non-circular cross-sections such as polygonal shapes or special shapes, and the gears of the gear mechanisms 204 and 205 and the ends of the worm 207 may be provided with non-circular matching holes for accommodating the connecting rod 201 and the drive shaft 206, so that after being assembled, the gears of the gear mechanisms 204 and 205 and the worm 207 cannot rotate relative to the corresponding connecting rod 201 and/or the drive shaft 206.

In the embodiments according to the present disclosure, the gear mechanisms 204 and 205, the worm 207, and the arc-shaped connecting member 208 may all be made of plastic. The connecting rod 201 and the drive shaft 206 may be made of glass fiber. In order to further enhance the torsional strength of the connecting rod 201 and the drive shaft 206, the drive shaft 206 may also be made of high-strength plastic, metal or other materials with high torsional strength.

Similarly, although the transmission mechanism 200 according to the present disclosure includes a plurality of connecting rods 201 and a plurality of gear mechanisms in the embodiment shown in FIG. 11, it should be understood that the transmission mechanism 200 according to the present disclosure may include only one connecting rod 201 and one gear mechanism while still maintaining the aforementioned advantages.

Exemplary embodiments according to the present invention have been described above with reference to the attached drawings. However, those skilled in the art should understand that various changes and modifications can be made to the exemplary embodiments of the present invention without departing from the gist and scope of the present invention. All changes and modifications are included in the protection scope of the present invention defined by the claims. The present invention is defined by the attached claims, and equivalents of these claims are also included.

The invention claimed is:

1. A transmission mechanism for a base station antenna, including a motor and at least one connecting rod,
    wherein a gear mechanism is provided on a first end of the connecting rod, and the motor drives the connecting rod to rotate via the gear mechanism;
    wherein a worm gear unit is provided on a second end of the connecting rod opposite to the first end, and the worm gear unit is configured to drive a movable element of a phase shifter when the connecting rod rotates; and
    wherein the gear mechanism includes a driving gear and a driven gear, the driving gear is configured to be driven by the motor, and the driving gear is meshed and connected with the driven gear to drive the connecting rod to rotate via the driven gear.

2. The transmission mechanism for a base station antenna according to claim 1, wherein each of the driving gear and the driven gear is configured as a helical gear, and a rotation axis of the driving gear and a rotation axis of the driven gear are configured to be perpendicular to each other.

3. The transmission mechanism for a base station antenna according to claim 1, wherein the motor includes an output shaft that extends along an axial direction of the connecting rod, another driving gear is mounted on an end of the output shaft, and the other driving gear is meshed and connected with the driving gear of the gear mechanism to drive the driving gear of the gear mechanism to rotate.

4. The transmission mechanism for a base station antenna according to claim 1, wherein the worm gear unit includes a worm and a toothed arc-shaped connecting member meshed and connected with the worm, the worm is mounted on the second end of the connecting rod and extends along the axial direction of the connecting rod, and the movable element of the phase shifter is fixedly connected with the arc-shaped connecting member on a side surface of the arc-shaped connecting member.

5. The transmission mechanism for a base station antenna according to claim 4, wherein the worm gear unit includes a pair of arc-shaped connecting members, a first arc-shaped connecting member and a second arc-shaped connecting member of the pair of arc-shaped connecting members are arranged opposite to each other on both sides of the worm and are substantially in the same horizontal plane as the worm.

6. The transmission mechanism for a base station antenna according to claim 5, wherein the inclined direction of teeth of the first arc-shaped connecting member and the inclined direction of teeth of the second arc-shaped connecting member of the pair of arc-shaped connecting members are opposite to each other.

7. The transmission mechanism for a base station antenna according to claim 1, wherein the transmission mechanism further includes a supporting member for supporting the gear mechanism and/or the worm gear unit.

8. The transmission mechanism for a base station antenna according to claim 7, wherein the supporting member includes a base and a ring-shaped body on the base, and the ring-shaped body includes an annular channel for accommodating the gear of the gear mechanism and/or an end of the worm gear unit.

9. The transmission mechanism for a base station antenna according to claim 8, wherein the ring-shaped body is configured as a flexible member and includes a cutout so that the annular channel of the ring-shaped body can expand and/or shrink.

10. The transmission mechanism for a base station antenna according to claim 1, wherein the transmission mechanism includes a plurality of connecting rods which are arranged in parallel, the gear mechanism is provided on a first end of each connecting rod, and the worm gear unit is provided on a second end of each connecting rod.

11. The transmission mechanism for a base station antenna according to claim 10, wherein the plurality of connecting rods is driven by the single motor to rotate synchronously.

12. The transmission mechanism for a base station antenna according to claim 10, wherein the transmission mechanism further includes another gear mechanism, and the motor synchronously drives the gear mechanism provided at the first end of each connecting rod via the other gear mechanism, so that the plurality of connecting rods rotates synchronously.

13. The transmission mechanism for a base station antenna according to claim 12, wherein the other gear mechanism and the gear mechanism provided at the first end of each connecting rod each include a driving gear and a driven gear meshed and connected with each other, the driving gear of the other gear mechanism is fixed at one end of the output shaft of the motor, and the driven gear of the other gear mechanism and the driving gear of the gear mechanism provided at the first end of each connecting rod are fixedly mounted on the same drive shaft.

14. The transmission mechanism for a base station antenna according to claim 13, wherein each of the driving gear and the driven gear is configured as a helical gear, and a rotation axis of the driving gear and a rotation axis of the corresponding driven gear are configured to be perpendicular to each other.

15. The transmission mechanism for a base station antenna according to claim 13, wherein the drive shaft extends in a direction perpendicular to the connecting rod.

16. The transmission mechanism for a base station antenna according to claim 13, wherein the drive shaft is made of glass fiber.

17. The transmission mechanism for a base station antenna according to claim 1, wherein the connecting rod is made of glass fiber.

18. The transmission mechanism for a base station antenna according to claim 17, wherein the connecting rod has a non-circular cross-section.

19. A base station antenna comprising the transmission mechanism of claim 1.

* * * * *